W. F. MANGELS.
CAROUSEL.
APPLICATION FILED JULY 17, 1914.
1,168,089.
Patented Jan. 11, 1916.
5 SHEETS—SHEET 5.
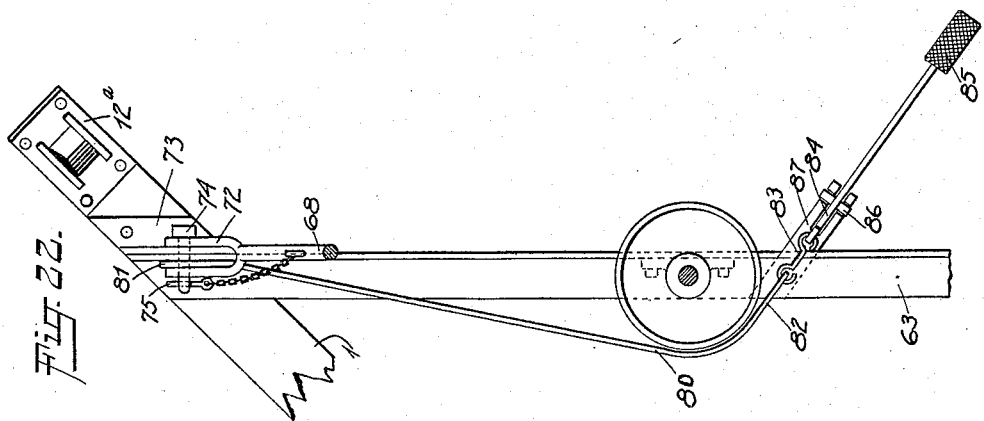
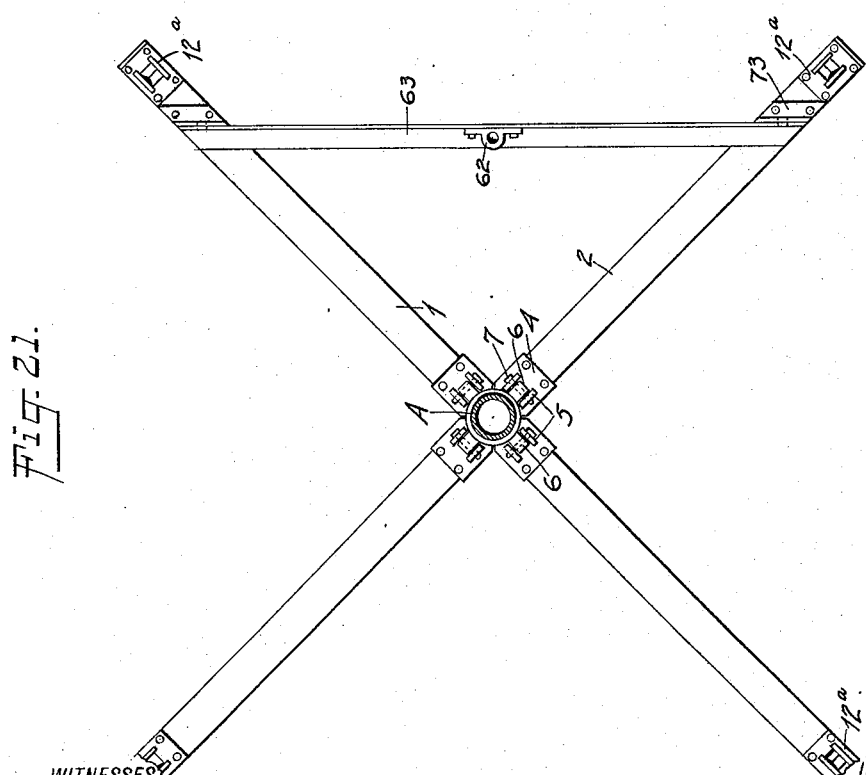
WITNESSES
William P. Goebel.
E. Bradway.
INVENTOR
William F. Mangels
BY 
ATTORNEYS

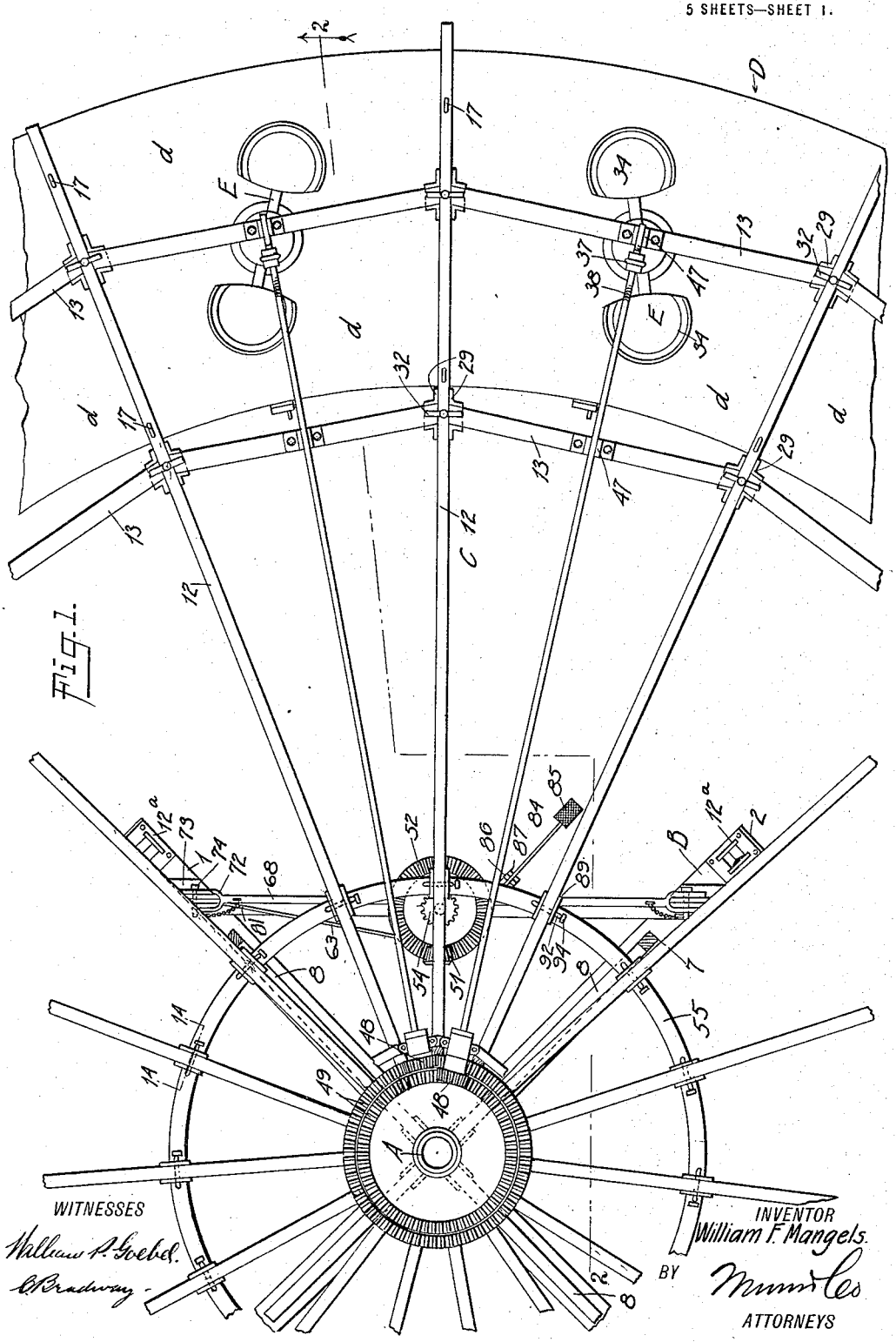

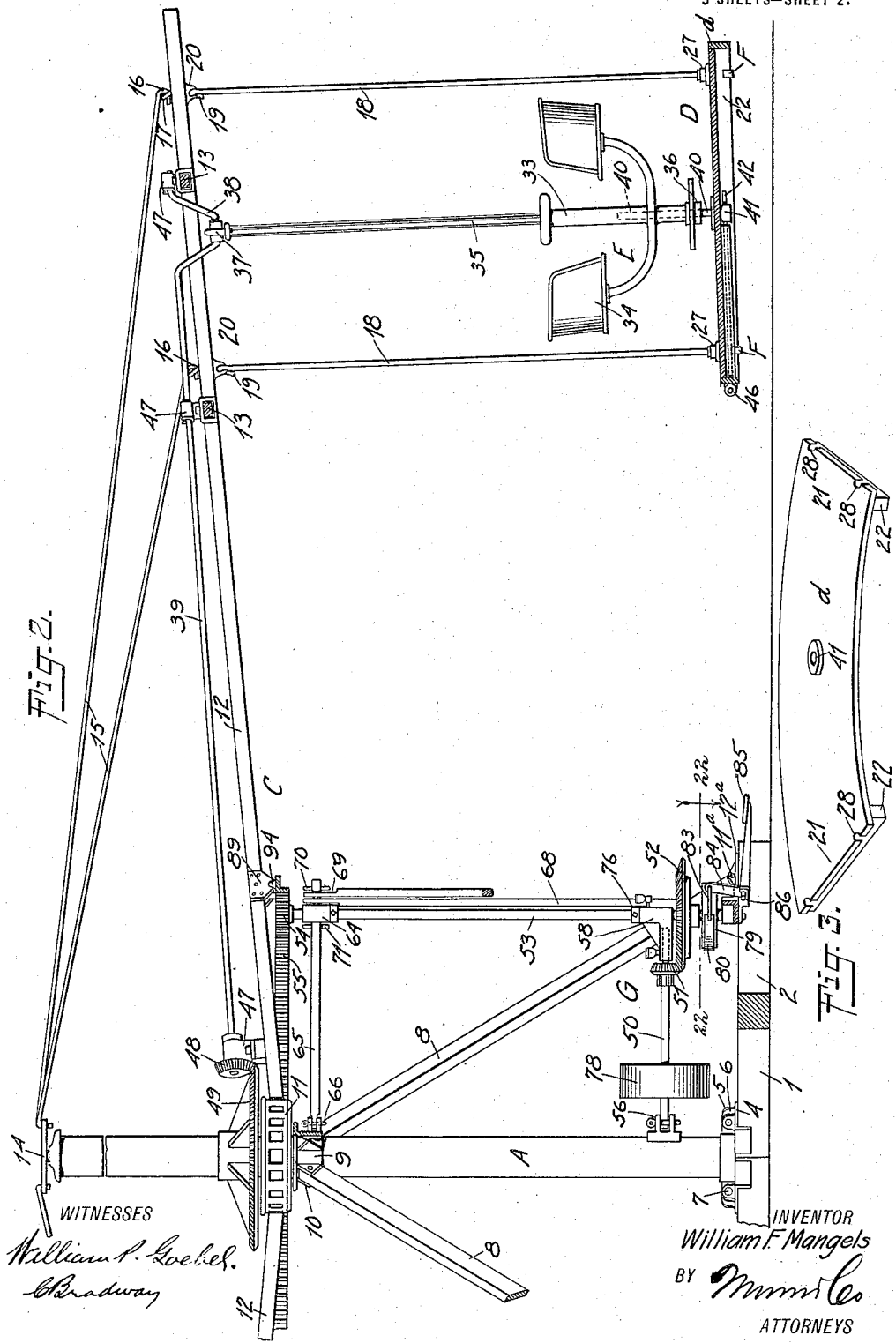

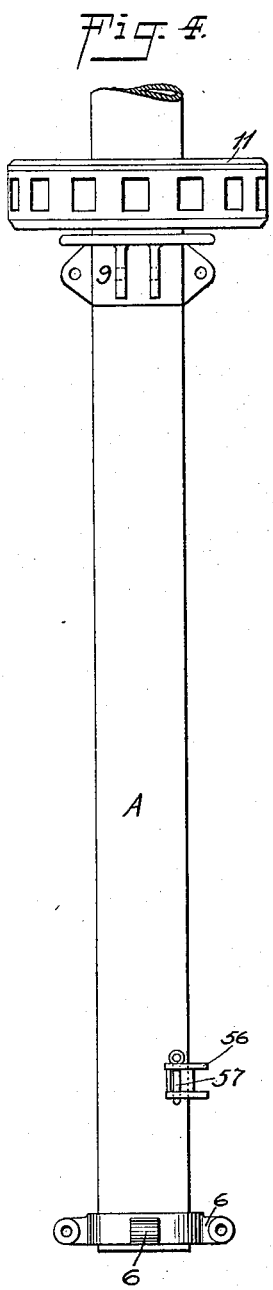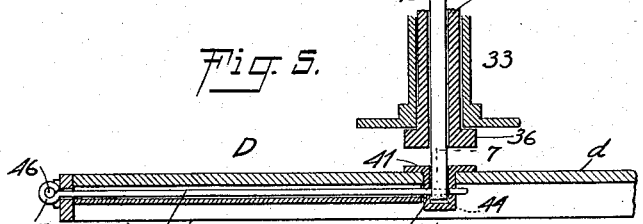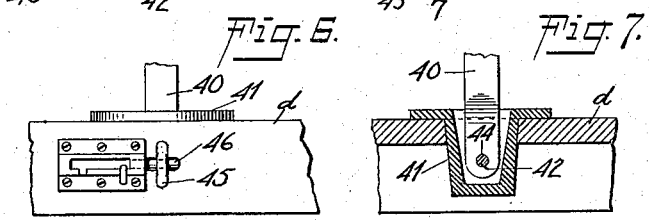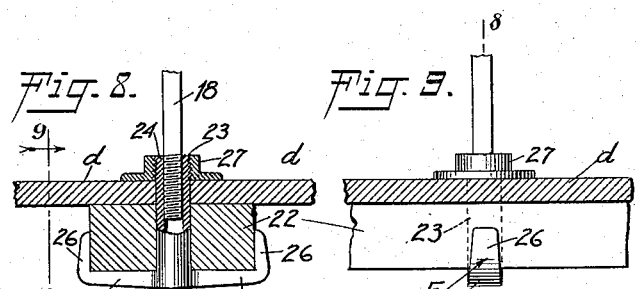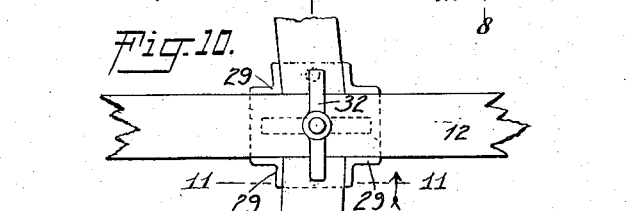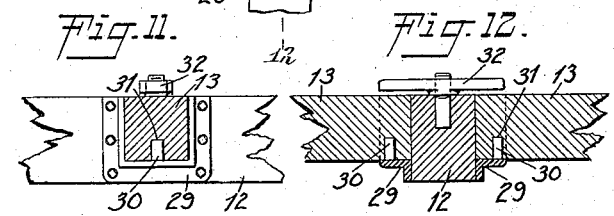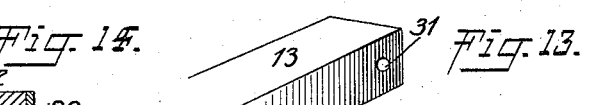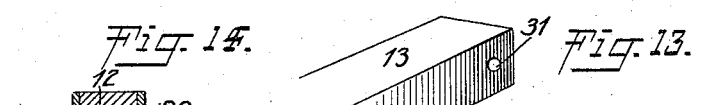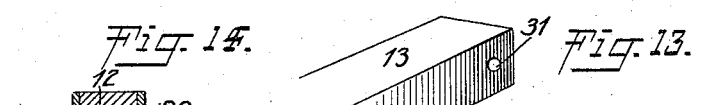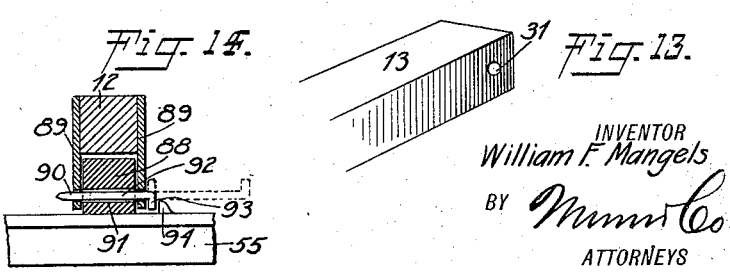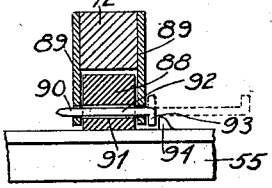

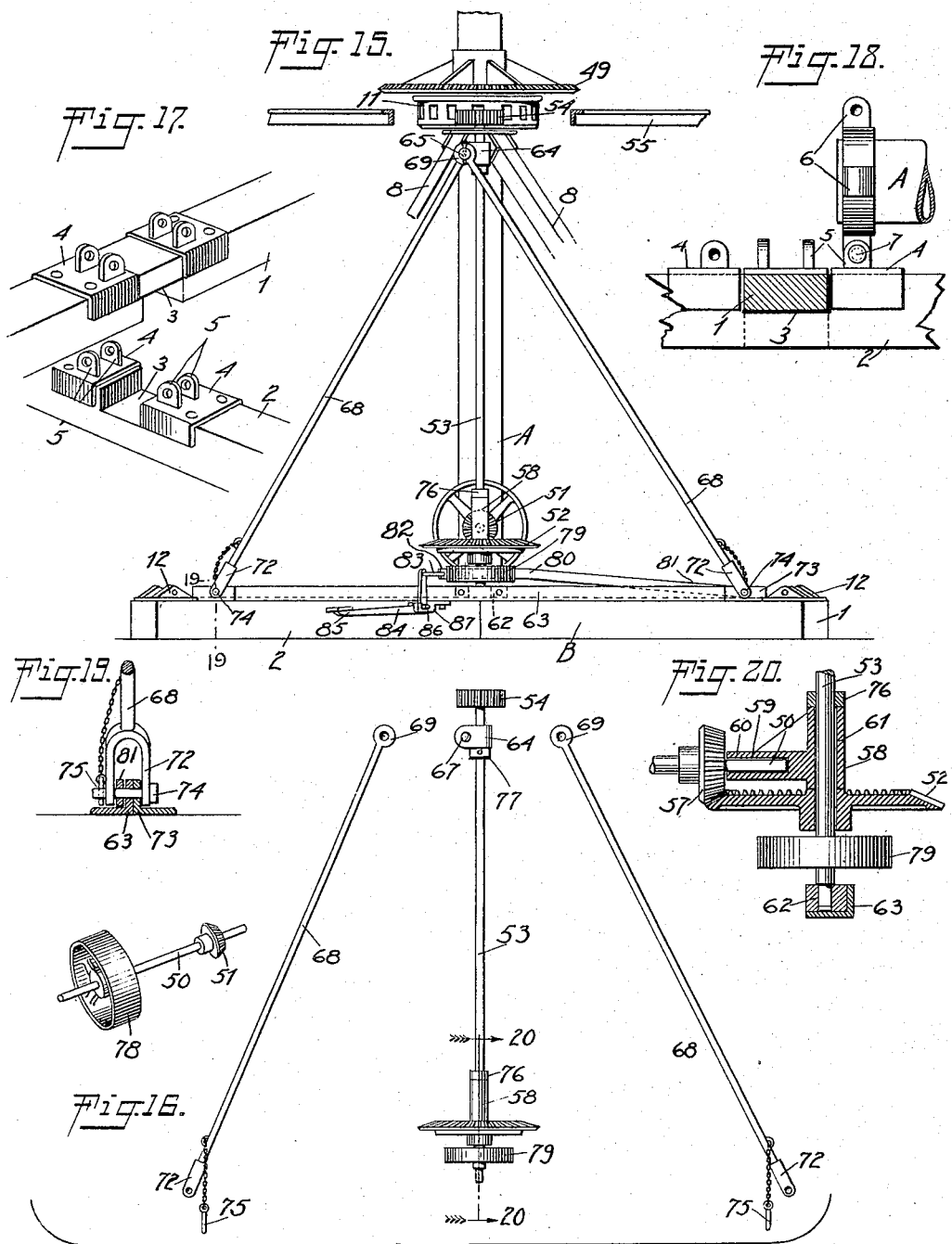

UNITED STATES PATENT OFFICE.

WILLIAM F. MANGELS, OF NEW YORK, N. Y.

CAROUSEL.

1,168,089. Specification of Letters Patent. Patented Jan. 11, 1916.

Application filed July 17, 1914. Serial No. 851,512.

*To all whom it may concern:*

Be it known that I, WILLIAM F. MANGELS, a citizen of the United States, and a resident of the city of New York, Coney Island, borough of Brooklyn, in the county of Kings and State of New York, have invented a new and Improved Carousel, of which the following is a full, clear, and exact description.

This invention relates to amusement apparatus, and more particularly to a carousel of the portable or knock-down type.

The invention has for its general objects to improve and simplify the construction and operation of apparatus of the character referred to so as to be reliable and efficient in use, comparatively inexpensive to manufacture and so designed as to be capable of easy and quick erection or disassemblement.

A further object of the invention is the provision of a novel column structure and mounting therefor whereby the column can be easily and quickly put up or taken down, and whereby the column will be strongly and rigidly braced.

A further object is to provide a novel form of annular platform for the figures and other passenger carriers, the platform being made in sections which detachably interlock with the platform suspension rods, which rods are formed with a special form of hook for engagement with the platform sections.

An additional object is the employment of novel means for connecting the passenger carriers to the platform in such a manner that they can be readily attached or detached, such passenger carriers being of the compound motion type, whereby they vertically reciprocate while capable of having rotary motion about the axis on which they vertically reciprocate.

The invention has as a further object the provision of a simple, effective and new form of driving mechanism whereby the passenger platform is rotated, such mechanism being composed of detachably connected and geared shafts, whereby motion is transmitted to the rotary structure of the carousel, there being on one of the shafts a novelly arranged brake device for arresting the motion of the rotary structure.

Another object is to provide improved connecting means between the outer ends of the platform suspending arms of the carousel rotary structure, such connecting means including devices whereby attachment to or detachment from the said arms can be easily and readily effected.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a plan view of a portion of the carousel; Fig. 2 is a vertical section on the line 2—2, Fig. 1; Fig. 3 is a perspective view of one of the platform sections or segments; Fig. 4 is a side view of the lower part of the central supporting column; Fig. 5 is an enlarged sectional view through the center of one of the platform segments, showing the manner of connecting a passenger carrier, car or the like to the platform; Fig. 6 is a detail view of the locking bolt for a pintle pin that connects a passenger carriage with a platform segment; Fig. 7 is a detail sectional view on the line 7—7, Fig. 5; Fig. 8 is a sectional view on the line 8—8, Fig. 9, showing the connection between a suspension rod and two adjacent sections of the platform; Fig. 9 is a sectional view on the line 9—9, Fig. 8; Fig. 10 is a plan view of the construction of the joints between the platform suspension arms and the cross-connecting bars; Fig. 11 is a sectional view on the line 11—11, Fig. 10; Fig. 12 is a sectional view on the line 12—12, Fig. 10; Fig. 13 is a perspective view of one end of one of the cross connecting bars between the platform suspending arms; Fig. 14 is a detail sectional view on the line 14—14, Fig. 1, showing the means for connecting the circular rack with the platform-carrying arms; Fig. 15 is a side view of the driving mechanism for the rotary structure of the carousel; Fig. 16 is a view of parts of the driving mechanism disassembled; Fig. 17 is a perspective view of the members of the column-supporting base frame in their relative position for assembling; Fig. 18 is a detail view showing the supporting column in its initial position of mounting on the base or supporting frame; Fig. 19 is a detail sectional view on the line 19—19, Fig. 15; Fig. 20 is a sectional view on the line 20—20, Fig. 16; Fig. 21 is a plan view of the base frame; and Fig. 22 is a horizontal section on the line 22—22, Fig. 2, to show the brake for the driving mechanism.

Referring to the drawing, A designates the central supporting column which is mounted on a base frame B which is composed of two beams 1 and 2 which extend at rightangles to and across each other, as clearly shown in Figs. 1 and 22, the beams 1 and 2 being at the point of crossing halved or provided with recesses 3, as clearly shown in Fig. 17, so that each beam will be set into the other, whereby the beams are rigidly held in right-angular relation. The top of each beam is provided at opposite sides of its central recess 3 with anchor plates 4 which are formed each with upstanding spaced lugs 5, and on the bottom of the column A are radially projecting lugs 6 which are adapted to engage between ears 5 of the anchor plates, and through these lugs and ears fastening means, such as bolts 7, pass so as to rigidly secure the column to the base frame. In erecting the column the latter is supported in a horizontal position, and one of the lugs 6 is engaged between the ears of one of the anchor plates 4, and a bolt 7 is inserted. The column is then swung upwardly on the bolt as a pivot until a vertical position is reached, when the remaining lugs 6 will enter the respective anchor plates so that the bolts 7 can be applied to rigidly secure the column in position. Obviously the column can be taken down in as easy a manner. To impart the necessary rigidity to the stationary supporting structure of the carousel, the braces 8 are employed between the outer ends of the base beams 1 and 2 and the column A, which latter has at an intermediate point a ring 9 to which the upper ends of the braces are connected by pins or equivalent means 10, the lower ends of the braces being fastened by pins 11ª or the like to anchor pieces 12ª on the outer ends of the beams. Of course, in taking down the carousel these braces 8 are first detached before the column can be disconnected from the base frame.

On the upper part of the column is a wheel construction C which suspends the passenger platform D, and the passenger carriers E. This wheel construction comprises a hub 11 fastened to the column A, and spokes or arms 12 which radiate from the hub 11 and are united at their outer portions by cross-connecting bars 13. On the top of the column is a cap piece 14 to which are connected radially disposed braces 15 which terminate in hooks 16 at their outer ends and detachably engage in eyes 17 on the tops of the arms or spokes 12. Each arm 12 has detachably connected to its outer portion depending parallel suspending rods 18 which carry the platform D, these rods having hooks 19 at their upper ends which removably engage in eyes or equivalent fixtures 20 on the arms 12. It will be understood that when the platform is detached from the overhead structure and the rods 15 are disconnected, the arms 12 can be removed from the hub 11.

The platform D comprises a plurality of segments $d$ which are supported by the suspension rods 18. Each segment has at its radial ends 21 cleats 22, Figs. 3, 8 and 9, fastened to the under side thereof, and inverted T-shaped connecting devices F engage with these cleats to clamp the sections together. Each device F comprises a central stem 23 that is provided with an interiorly-threaded socket 24 to receive the lower end of a suspension rod 18 which screws into the socket, and the laterally extending members 25 engage under the cleats 22, and on these members are upwardly-extending extensions 26 which engage the outer vertical edges of the cleats. In other words, the device F comprises a pair of oppositely-disposed hooks into which the cleats set. On the socketed stem 23 of the device F is screwed a clamping collar 27 which engages the top surface of two adjacent segments $d$ and clamps them to the hooks 25. Thus, in assembling the platform the suspension rods are first hooked on the arms 12 with the segment connecting devices F attached to the rods and with the collars 27 loose from the stems 23. The platform segments $d$ are then placed in position, one segment being disposed between adjacent sets of suspension rods 18, and when in assembled position each segment rests on two pairs of supporting hooks 25. To insure circular alinement of the segments and to prevent outward radial displacement the edges are provided with recesses 28, as clearly shown in Fig. 3, so as to fit the stems 23. After the segments are positioned the collars 27 are screwed on the stems 23, so that the segments of the platform will be rigidly held in place.

The cross-connecting bars or braces 13 have their ends detachably connected with adjacent arms or spokes 12 by means shown in Figs. 10 to 13 inclusive. Each arm has on opposite sides U-shaped socket pieces or brackets 29, and on the bottom of each is an upstanding stud 30 which is adapted to engage in an opening 31 in the bottom surface of the cross-bar 13 at the end, as shown in Fig. 13. The bars 13 are of just such length as to set in between two adjacent arms 12, and in being lowered into the socket pieces 29 the studs 30 will enter the openings 31. To hold the cross-bars in their socket pieces a keeper 32 in the form of a centrally pivoted turn button is mounted on each arm 12 at a point between each pair of oppositely disposed brackets 29, so that one keeper will hold the adjacent ends of alining connecting bars 13 fastened to their intermediate arm 12. By uniting the arms 12 of the overhead structure with the cross-connecting bars in this manner no fastenings are required to be inserted or removed, it being merely necessary to turn the keeper to the dotted-line position, Fig. 10, so that the cross bars can be inserted or removed.

Any suitable passenger carriers, cars, figures or the like may be arranged on the platform, but in the present instance the passenger carriers E are of that type which have compound motion. In the present instance the carrier E comprises a central rotary post 33 or equivalent means with a plurality of seats 34 mounted thereon, and passing through this post is a rod 35 around which the carrier E can rotate as an axis. This rod has a bearing collar 36 on which the bottom of the post 33 rotatably rests, and the upper end 37 of this rod 35 is hooked over a crank 38 in the outer end of a crank shaft 39, so that as the crank shaft rotates the rod 35 will have a vertical up and down movement. The lower end of the rod 35 is connected by a slip joint device with the platform D, such device consisting, as shown in Figs. 2, 5 and 7, of a short vertically-disposed rod 40 which telescopes into the lower end of the rod 35 which is tubular to receive the member 40. The lower end of the member 40 enters a socket or bearing piece 41 and is hingedly connected therewith by a pintle pin 42. This pintle pin passes through openings 43 and 44 in the central piece 41 and member 40 and is long enough to extend radially of the platform D to the inner edge thereof and there terminates in an eye 45 which is engaged by a slide bolt 46, as shown in Fig. 6. By removing the slide bolt 46 the pintle pin 42 can be pulled out far enough to disengage the member 40 from the platform, as when the carousel is to be taken down. It will be observed from Fig. 1 that the passenger carriers E are located at the center of the platform segments d, so that the pintle pins 42 extend radially and centrally of the said platform sections. By hingedly connecting the members 40 with the platform the carrier reciprocating rod 35 can oscillate with the rotation of their cranks 38, so that the passenger carriers E have a compound motion which is the resultant of three motions, namely, the rotary motion due to the passengers in turning the carrier, the vertical reciprocatory motion due to the rotation of the crank 38, and the oscillatory motion also due to the crank. The crank shafts 39 are removably mounted in bearings 47 arranged on the arms 12, and the inner ends of the crank shafts are provided with beveled pinions 48 which mesh with one or more stationary beveled gears 49 fastened on the column A above the hub 11.

The rotary structure of the carousel is driven by a mechanism G which comprises a horizontally disposed shaft 50 which has a beveled pinion 51 that meshes with a beveled gear 52 fastened to a vertical shaft 53, and on the upper end of this shaft 53 is fastened a pinion 54 that meshes with a circular rack 55 carried by and disposed under the arms 12. This driving mechanism is so designed and mounted that it can be readily taken apart and put together. The inner end of the shaft 50 is journaled in a bearing 56 fastened to the column A and is retained in the bearing by a keeper pin 57 and the outer end of the shaft 50 is journaled in an L-shaped bracket 58 which, as shown in Fig. 20, has a horizontal arm 59 provided with a bearing 60 for the shaft 50, and it also has a vertical bearing 61 through which extends the vertical shaft 53. By taking out the pin 57 in the bearing 56 the shaft 50 can be removed and then pulled out of the bearing 60 of the bracket 58. The shaft 53 is also removably mounted so as to be taken down, and for this purpose the lower end of the shaft 53 is mounted in a step bearing 62 arranged on the center of a horizontal angle-bar 63, which bar is fastened to the beams 1 and 2 on the base frame, as shown in Figs. 1, 15, 21 and 22. The upper end of the shaft 52 is journaled in a bearing bracket 64 which is supported on a horizontal bracing bar 65, which bar is detachably and horizontally connected at 66 with the column A, and has its outer end fastened through an opening 67 in the bearing element 64, as clearly shown in Figs. 15 and 17. Steadying rods 68 have their upper ends connected with the outer end of the horizontal bar 65 and diverged downwardly therefrom and are connected with the ends of the angle-bar 63. The upper ends of these steadying bars 68 are provided with eyes 69 to receive the outer end of the bar 65, and a pin 70 inserted in this bar holds the steadying elements 68 detachably connected therewith. The bearing element 64 is prevented from sliding inwardly on the bar 65 by means of a pin or equivalent device 71 inserted in the bar 65. The lower ends of the steadying rods 68 are formed with bifurcations 72, as shown in Fig. 19, and span the angle-bar 63 and the angle bracket pieces 73 which are fastened to the base beams 1 and 2, and a bolt 74 passes through the bifurcations 72 and bar 63 and bracket pieces 73 to rigidly attach the said steadying bars 68 to the base frame. A keeper pin 75 passes through the bolt pins 74, so that they will not become accidentally detached. In disassembling the vertical shaft 53 the steadying rods 68 are first removed, the brace rods 65 detached from the column, then detached from the bearing 64, and finally the shaft 53 is lifted out of the step bearing 62, the bearing brackets 58 and 64 remaining on the shaft 53 and also the gear 52 and pinion 54, as shown in Fig. 16. The bracket 58 is confined between the gear 52 and a collar 76, and the bearing bracket 64 is confined between a collar 77 and the pinion 54.

The shaft 50 is adapted to be driven in any suitable manner, as, for instance, by a pulley 78 that is belted to an electric or other motor, and the power is transmitted to the rotary structure through the shaft 50, gearing 51, 52, shaft 53, pinion 54 and circular rack 55, which is fastened to the rotary structure of the carousel, and as this structure rotates the pinions 48 of the crank shaft by meshing with the stationary gear 49, will cause the crank shafts to rotate and impart vertical reciprocatory motion to the passenger carriers. In order to stop the rotary structure a brake device operates on the shaft 53. This shaft has a brake wheel or drum 79, and coöperating with this wheel is a flexible shaft, shoe or equivalent means 80, which has its end 81 secured by the bolt pins 74, as shown in Fig. 22, and the other end 82 is connected by a link 83 with the bell-crank lever 84, there being a foot-piece or treadle 85 on the lever, whereby the operator can apply the brake by foot pressure. This lever is provided with a fulcrum 86 which removably sets in a bearing bracket 87 secured to the angle-bar 63. It will be understood that this bearing bar 63 is detachably connected with the angle-pieces 73 on the base beams 1 and 2, so that when the pins 74 are removed the angle-bar can be disconnected from the base beam and thereby allow the latter to be disconnected from the other.

The circular rack 55, which is preferably made in sections, is detachably connected with the arms 12 by means shown in Fig. 14. On the rack are upwardly-extending lugs 88 which engage between plates 89 on the sides of the arms 12, and these plates have apertures 90 which aline with apertures 91 in the lugs 88, and pins 92 extend through these apertures for connecting the circular rack bar with the arms 12. An offset head 93 is provided on each connecting pin 92, and this head gravitates to a depending position so as to engage behind a stop 94 on the top of the rack bar. In inserting or removing the pin 92 it is so held that the head projects upwardly, and when the pin is fully inserted the same is turned so that the head will occupy a depending position and be kept in place by the stop or keeper 94.

From the foregoing description taken in connection with the accompanying drawings, the advantages of the construction and method of operation will be readily understood by those skilled in the art to which the invention appertains, and while I have described the apparatus which I now consider to be the best embodiment thereof, I desire to have it understood that the apparatus shown is merely illustrative and that such changes may be made when desired as are within the scope of the appended claims.

Having thus described my invention, I claim as new and desire to secure by Letters Patent:

1. In a carousel, the combination of a supporting column, a rotary structure thereon including platform-supporting arms, a circular rack arranged concentric with the column and disposed under the arms, lugs on the upper side of the rack, ears on the arms, and pins fastened through the lugs and ears for detachably connecting the rack with the arms.

2. In a carousel, the combination of a supporting column, a rotary structure thereon including platform-supporting arms, a circular rack arranged concentric with the column and disposed under the arms, lugs on the upper side of the rack, ears on the arms, pins fastened through the lugs and ears for detachably connecting the rack with the arms, said pins having heads adapted to assume a pendent position when the pins are inserted, and stops on the rack disposed in front of the pendent heads to prevent accidental detachment of the pins.

3. A knock-down carousel comprising a supporting column, a rotary structure mounted thereon and composed of detachably connected parts, a base on which the column is detachably mounted, an operating shaft for rotating the said structure, a lower bearing in which the shaft is removably mounted, an upper bearing in the form of a block having a vertical opening for receiving the shaft, and also having a horizontal opening, a brace rod connected with the column and extending through the horizontal opening of the bearing block to support the latter, and means for rotating the said shaft.

4. A knock-down carousel comprising a supporting column, a base frame therefor, a rotary structure mounted on the column, a circular rack carried by the said structure, a vertical shaft, a pinion on the shaft meshing with the said rack, a bearing on the base frame in which the shaft is removably mounted, a brace rod connected with the column, a bearing on the shaft and having an opening through which the brace rod extends, and means on the rod for preventing the bearing from shifting on the latter, and means for rotating said shaft.

5. A knock-down carousel comprising a supporting column, a base frame therefor, a rotary structure mounted on the column, a circular rack carried by the said structure, a vertical shaft, a pinion on the shaft meshing with the said rack, a bearing on the base frame in which the shaft is removably mounted, a brace rod connected with the column, a bearing on the shaft and having an opening through which the brace rod extends, and means on the rod for preventing the bearing from shifting on the latter, steadying bars detachably connected with the outer end of the brace rod, and means detachably connecting the steadying rods with the base frame.

6. A knock-down carousel comprising a supporting column, a base frame therefor, a rotary structure mounted on the column, a circular rack carried by the said structure, a vertical shaft, a pinion on the shaft meshing with the said rack, a bearing on the base frame in which the shaft is removably mounted, a brace rod connected with the column, a bearing on the shaft detachably connected with the brace rod, steadying bars detachably connected with the outer end of the brace rod, means detachably connecting the steadying rods with the base frame, a bearing bracket on the said shaft, a horizontally-disposed shaft having one end detachably mounted on the column and the other end detachably mounted in the bearing bracket, a gearing between the shafts, and means for applying power to the second-mentioned shaft.

7. A knock-down carousel comprising a supporting column, a base frame therefor, a rotary structure mounted on the column, a circular rack carried by the said structure, a vertical shaft, a pinion on the shaft meshing with the said rack, a bearing on the base frame in which the shaft is removably mounted, a brace rod connected with the column, a bearing on the shaft detachably connected with the brace rod, streadying bars detachably connected with the outer end of the brace rod, means detachably connecting the steadying rods with the base frame, a bearing bracket on the said shaft, a horizontally disposed shaft having one end detachably mounted on the column and the other end detachably mounted in the bearing bracket, a gearing between the shafts, means for applying power to the second-mentioned shaft, and a brake device for the first-mentioned shaft.

8. In a knock-down carousel, the combination of a supporting base composed of detachably connected parts, a column thereon, a rotary platform-carrying structure mounted on the column, a bar detachably mounted on the parts of the supporting base, a bearing on the bar, a vertical shaft having its lower end mounted in the bearing, means operatively connecting the upper end of the shaft with the rotary structure for turning the same, a brake wheel on the said shaft, a brake element arranged to engage the said wheel, a lever for operating the brake element, and means for detachably mounting the said lever on the said bar.

9. In a knock-down carousel, the combination of a supporting base, a column detachably mounted thereon, a rotary platform-carrying structure mounted on the column, a vertically disposed shaft operatively connected with the rotary structure to rotate the same, a member connected with the column and extending outwardly therefrom, a bearing on the member for the said shaft, bracing rods connected with the outer end of the member and extending outwardly and downwardly therefrom in opposite directions, brackets on the supporting base, means for detachably connecting the lower ends of the brace rods to the said brackets, a bar connected with the said brackets, a bearing on the bar for the lower end of the said shaft, a brake wheel on the shafts, a brake element detachably fastened to one of the brackets on the supporting base, a lever detachably mounted on the said bar, and means for connecting the lever with the brake element for operating the same.

10. In a knock-down carousel, the combination of a supporting base, a column detachably mounted thereon, a rotary platform-carrying structure mounted on the column, a vertically disposed shaft operatively connected with the rotary structure to rotate the same, a member connected with the column and extending outwardly therefrom, a bearing on the member for the said shaft, bracing rods connected with the outer end of the member and extending outwardly and downwardly therefrom in opposite directions, brackets on the supporting base, means for detachably connecting the lower ends of the brace rods to the said brackets, a bar connected with the said brackets, a bearing on the bar for the lower end of the said shaft, a brake wheel on the shafts, a brake element detachably fastened to one of the brackets on the supporting base, a lever detachably mounted on the said bar, means for connecting the lever with the brake element for operating the same, a bearing bracket carried by the said shafts and permanently attached thereto, a gear on the shaft between the brake wheel and bearing bracket, a horizontally disposed shaft having one end detachably mounted in the bearing bracket and the other end detachably mounted on the column, a pinion on the last-mentioned shaft engaging with the said gear, and means for rotating the second-mentioned shaft.

In testimony whereof I have signed my name to this specification in the presence of two subscribing witnesses.

WILLIAM F. MANGELS.

Witnesses:
CHATTEN BRODWAY,
PHILIP D. ROLLHAUS.

Copies of this patent may be obtained for five cents each, by addressing the "Commissioner of Patents, Washington, D. C."